United States Patent
Chang et al.

(10) Patent No.: US 11,074,183 B2
(45) Date of Patent: Jul. 27, 2021

(54) APPARATUS AND METHOD OF READ LEVELING FOR STORAGE CLASS MEMORY

(71) Applicant: Wolley Inc.

(72) Inventors: Yu-Ming Chang, Zhubei (TW); Tai-Chun Kuo, Taipei (TW); Chuen-Shen Bernard Shung, San Jose, CA (US)

(73) Assignee: Wolley Inc., San Jose, CA (US)

( * ) Notice: Subject to any disclaimer, the term of this patent is extended or adjusted under 35 U.S.C. 154(b) by 38 days.

(21) Appl. No.: 16/729,306

(22) Filed: Dec. 28, 2019

(65) Prior Publication Data
US 2021/0200676 A1 Jul. 1, 2021

(51) Int. Cl.
*G06F 12/0811* (2016.01)
*G06F 12/0808* (2016.01)
*G06F 12/12* (2016.01)
*G06F 12/02* (2006.01)

(52) U.S. Cl.
CPC ...... *G06F 12/0811* (2013.01); *G06F 12/0246* (2013.01); *G06F 12/0808* (2013.01); *G06F 12/12* (2013.01); *G06F 2212/1021* (2013.01); *G06F 2212/7211* (2013.01)

(58) Field of Classification Search
CPC .................................. G06F 12/0811
USPC .......................................... 711/154
See application file for complete search history.

(56) References Cited

U.S. PATENT DOCUMENTS

| | | | | |
|---|---|---|---|---|
| 5,386,526 | A * | 1/1995 | Mitra | G06F 12/0859 711/3 |
| 5,732,409 | A * | 3/1998 | Ni | G06F 12/0866 711/113 |
| 10,229,047 | B2 | 3/2019 | Shung | |
| 10,353,812 | B2 | 7/2019 | Shung | |
| 10,394,708 | B2 | 8/2019 | Shung | |
| 2009/0225084 | A1* | 9/2009 | Kato | G06T 1/60 345/441 |

* cited by examiner

*Primary Examiner* — Jae U Yu
(74) *Attorney, Agent, or Firm* — Blairtech Solution LLC (57) ABSTRACT

A method and apparatus for read wearing control for storage class memory (SCM) are disclosed. The read data control apparatus, located between a host and the SCM subsystem, comprises a read data cache, an address cache and an SCM controller. The address cache stores pointers pointing to data stored in logging area(s) located in the SCM. For a read request, the read wearing control determines whether the read request is a read data cache hit, an address cache hit or neither (i.e., read data cache miss and address cache miss). For the read data cache hit, the requested data is returned from the read data cache. For the address cache hit, the requested data is returned from the logging area(s) and the read data becomes a candidate to be placed in the read data cache. For read data cache and address cache misses, the requested data is returned from SCM.

16 Claims, 6 Drawing Sheets

APPARATUS AND METHOD OF READ LEVELING FOR STORAGE CLASS MEMORY

CROSS REFERENCE TO RELATED APPLICATIONS

The present invention is related to U.S. Non-Provisional patent application Ser. No. 15/230,414, filed on Aug. 6, 2016, now U.S. Pat. No. 10,229,047 issued on Mar. 12, 2019.

FIELD OF THE INVENTION

The present invention relates to memory control. In particular, the present invention relates to read leveling for memory device in order to extend the lifetime of the memory device.

BACKGROUND AND RELATED ART

In computer architecture the memory hierarchy is a concept used for storing and discussing performance issues in computer architectural design, algorithm predictions, and the lower level programming constructs such as involving locality of reference. The memory hierarchy in computer storage distinguishes each level in the hierarchy by response time. Since response time, complexity, and capacity are related, the levels may also be distinguished by their performance and controlling technologies.

In the context of this disclosure, the memory hierarchy of interest consists of (a) processor registers, (b) caches (L1, L2, L3, etc.), (c) main memory, and (d) disk storage. For memory devices that are "farther" away from the CPU (or "lower" in the memory hierarchy), the capacity is bigger while the response time is longer. The capacity of these memory devices is in the order of (a) less than Kilobytes, (b) Megabytes to tens of Megabytes, (c) tens of Gigabytes, and (d) Terabytes, respectively. The response time of these memory devices is in the order of (a) sub-nanoseconds, (b) nanoseconds, (c) tens of nanoseconds, and (d) tens of milliseconds for random access of Hard Disk Drives (HDDs), respectively. In recent years, one of the major technology advancement in memory hierarchy has been the wider adoption of solid-state disks (SSDs), built with NAND Flash, which improves the disk response time to tens of microseconds.

Even with SSDs, there is still a big gap in response time between (c) and (d). On top of that, (a)-(c) are "byte-addressable" (although in practice, memory hierarchy levels (b)-(c) are often addressed with 64-byte unit), while memory hierarchy level (d) is "block-addressable" with a block size typically 512-byte or 4K-byte. In computer terms, the former is a "memory access" while the latter is a "storage access" or "I/O (Input/Output) access". The different access semantics and block transfer size also increase the overhead of accessing the disk.

One attempt to avoid the disk access as much as possible, in order to improve performance, is to increase the main memory capacity. However, due to cost and power reason, there is a bound to this investment, especially as the Moore's Law scaling for DRAM will no longer be able to reduce cost and power much more. Furthermore, given the overwhelming trend of cloud computing and big data applications, the data size of interest is getting bigger and bigger, and hence simply trying to increase main memory capacity will lose in this foot race.

Other than response time and capacity difference, there is also another significant difference between memory and disk. Memory is volatile and disks (SSDs or HDDs) are non-volatile. When power is lost, the memory content is lost, while the disk content is kept. It is very important for online transaction processing (OLTP) to write the results to some non-volatile storage to formally complete the transaction to safeguard against unexpected power loss. This is another reason why disk operations are necessary. How to efficiently interact with disks while not slowing down the operation performance has been an active topic of research and development by computer scientists for decades.

It is therefore intuitively obvious that it would be ideal to have a memory device that has the response time and byte-addressable property of the memory, and the capacity and non-volatile property of the disks. This kind of memory is generally referred to as the Storage Class Memory (SCM) (G. Burr et al., "Overview of candidate device technologies for storage-class memory", *IBM Journal of Research and Development* 52(4/5): pp. 449-464, June 2008). In the past many years, there were numerous attempts by different companies and research groups to develop SCMs using different materials, processes, and circuit technologies. Some of the most prominent examples of SCMs to date include Phase Change Random Access Memory (PCRAM), Resistive Random Access Memory (RRAM), and Spin-transfer torque Magnetic Random Access Memory (STT-MRAM). In 2015, Intel™ and Micron™ announced advanced SCM that is claimed to be "1000 faster than NAND flash and 10 times denser than DRAM". If SCMs become available, many believe that a natural place in the memory hierarchy for SCMs will be between memory hierarchy level (c) and memory hierarchy level (d) mentioned above to bridge the gap in between.

SCM also has fundamental media problems (e.g. endurance) similar to those seen in traditional non-volatile memories. Either read or write operations can hurt the endurance of SCM device. Generally speaking, the damage caused by a write operation is larger than that by a read operation. For example, in an SCM specification, it might claim that each memory location can sustain at least $10^6$ writes, referred to as "write cycle", or $10^7$ reads, referred to as "read cycle". Once the number of operations executed on a memory location exceeds the write or read cycle, this location might become inaccessible by any read or write operation.

Please note that a similar concept exists in NAND device. For NAND, each block is composed of multiple pages (e.g. 512), where each block is a basic unit for an erase operation and each page is a basic unit for a read or write operation. A page in a block can only be written after this block is erased first, while each block can only be erased for a limited number of times (block endurance problem). Similarly, it is generally not recommended to read data from the same block too many times due to read endurance/disturbance problem. The software for NAND management, so-called flash translation layer (FTL), is usually implemented to manage NAND in the unit of block or page. For block endurance problems, FTL needs to build a table to track the erase count for each block and to make sure each block undergoes a similar number of erases. This scheme is typically called wear-leveling. For read endurance/disturbance problem, FTL usually moves data from block to block after some blocks received excess read operations with the help of counters for each block. Since the size of a NAND block is large, the total amount of information (e.g., table size) that needs to be stored for all blocks and be used by FTL is not huge. For performance reasons, this kind of information is usually considered to be stored in SRAM or DRAM. However, for the management of SCM, it is unacceptable to handle this information for the access unit (64B) which is much smaller than the NAND block size. For example, if a block size in NAND is 64 times larger than the access unit in SCM, the required size of a table for SCM is amplified by 64 times.

In the past, researches or inventions paid much more attention to minimize the impact from writes. Without ambiguity, the concept of "wear-leveling" generally refers to dealing with the write endurance problem and its goal is to evenly distribute writes over entire physical space. Therefore, the effective lifetime can be extended without prematurely wearing out some memory locations because of write and the performance usually depends on how evenly you can achieve. In this disclosure, we propose a management scheme for the problem of read endurance in SCM; more specifically, the problem that the allowed number of read operations in each memory location is limited. In this invention, our proposed scheme, called "read leveling", is to prevent any memory location from being read excessively. The specific method is to combine a small read cache with the address cache for 1) reducing the number of reads to SCM and 2) distributing read operations as evenly as possible over the entire SCM space. Ultimately, we intend to avoid any memory locations from exceeding its read cycle. In comparison with the NAND-concept management approach for read endurance/disturbance problems, our innovation can save cost in terms of information to be maintained, such as table size.

BRIEF SUMMARY OF THE INVENTION

In this invention, our read leveling scheme will use a read data cache, an address cache, and a reserved space, called logging area, in SCM. The read data cache will store frequently-read data and is used to intercept as many read operations as possible without reading SCM. As a read data cache realized by SRAM is usually costly, our main idea is to strategically extend the size of the read data cache using an address cache to store addresses corresponding to a part of SCM, such as a logging area, to store data when the read cache is full. Note that SRAM is expensive and SCM is relatively cheap. Therefore, storing small-size addresses (e.g., 4B) and large-size data (e.g., 256B) on SRAM and SCM respectively could save costs. There is no doubt that a larger read cache will be more effective for a better hit rate and therefore absorbs more read operations from the host without adversely affecting the read endurance of SCM.

The protection against read damage in this scheme are two-fold. First, serving read requests on the read cache implemented by SRAM is fastest and has no hurt on SCM. Second, the data evicted from the read cache will be sent to a logging area in SCM and the following reads to the same logging area will be limited to a specific number. There will be multiple logging areas and these logging areas are used in a round-robin way. In this way, reads can be distributed among different logging areas to achieve read-leveling. At the same time, there will have multiple logging areas, such as 4, that contain valid read data; a read valid data means that it has a corresponding entry in the address cache. As long as all entries of the same logging area are removed or replaced by new ones, then all data in this logging area will be regarded as invalid; later, this logging area can be reused either to store data evicted from read cache or to serve for other purposes. For the read data temporarily stored in the logging area, they will survive for a specific period. In other words, after a certain time, the data in the same logging area will be discarded by removing the corresponding index in the address cache.

For a read operation, it needs to first check whether a cache hit occurs on the read data cache or not. If yes, data is return. Otherwise, an embodiment of the present invention will try to insert the data of this read to the reads cache. If there is a free slot in the read cache for this read data, the data of this read is stored in the read cache. If not, it is typical to have an eviction policy for the read cache to determine a victim. Since the victim will go to the logging area according to the present invention, it will produce an extra write on SCM. To limit the number of extra write to SCM, there is a throttle design to the data read cache. If there is a need to execute the eviction policy in the case of no free slot, the throttle design will set a probability, such as 10%, to allow the eviction to happen. In this example, the maximum number of writes induced by reads is 10% of number of reads. One apparent advantage of this throttle design is to save the bandwidth of backend SCM. One not-so obvious advantage of the present invention is that it can avoid sequential read from invalidating the function of the read cache. For example, a long and sequentially-read access pattern will inevitably kick out all hot data identified by the read cache while the new read data are probably read by just once.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Let us define a generic SCM application as M/S subsystem, where M/S stands for memory/storage. Such an M/S subsystem supports read and write operation by a host. The data size of memory and storage applications may be different, most commonly 64 Byte (cache line) for memory applications, and 4 Kbyte for storage applications. Due to technical considerations, for memory applications, the data size of the host interface may still be 64 Bytes, but the data size for the SCM is multiple of 64 Bytes. Storage applications usually imply a non-volatile semantics and the technology is known in the field and is not repeated here.

Each memory bit of SCM usually has a suggested value for its read or write endurance from the memory manufacturer's specification. These values will limit the maximum number of operations (i.e., reads or writes) to the same memory bit, which is also called read cycle or write cycle respectively. Once the number of operations executed on a memory location exceeds the write or read cycle, this location might become inaccessible. Without loss of generality, it is assumed that all memory bits have a similar number of read cycle or write cycle in the same SCM. In other words, each data access size, such as 64 Bytes, should have the similar number of read cycles. This invention aims to avoid any SCM location in the unit of a specific data size, such as 64 Bytes, from being read excessively. Note that the present invention is not limited by any particular data size. The present invention is also applicable to other data sizes, such as 4 KB.

Figure 1:
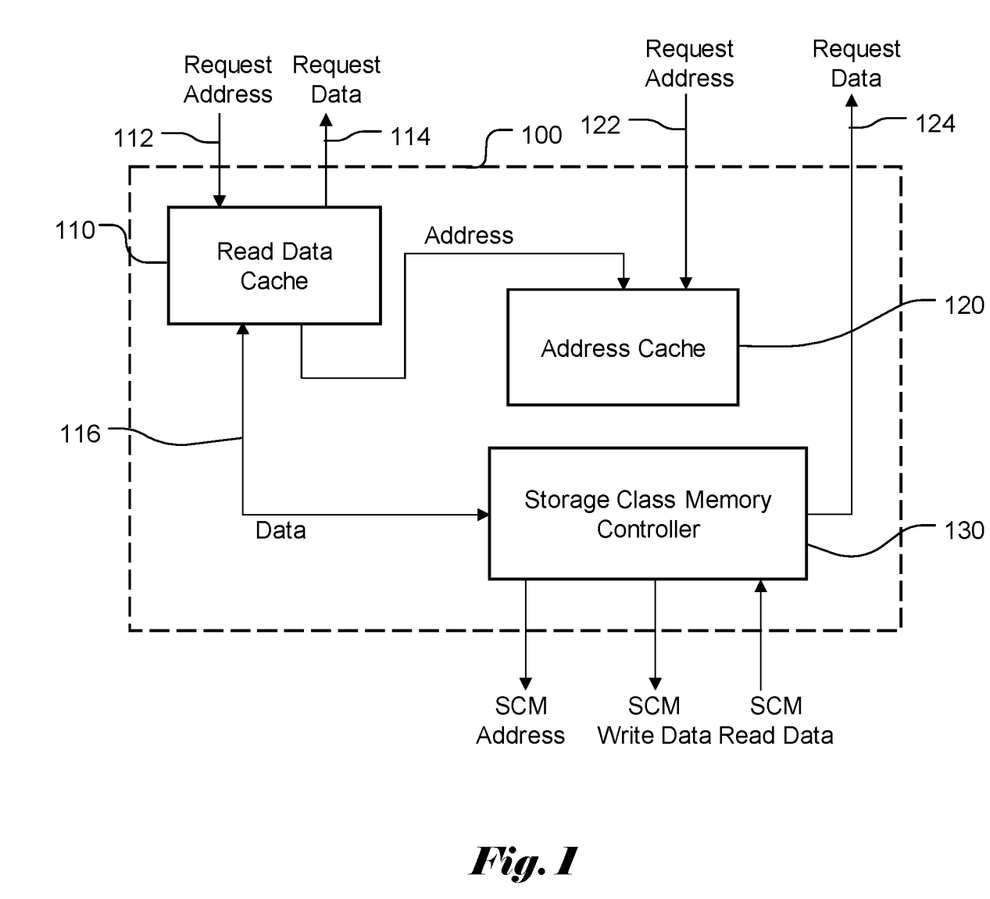
FIG. 1 illustrates an exemplary architecture of read-leveling control by using a read data cache and an address cache.

In this invention, we propose a read-leveling scheme that comprises 1) a read data cache, 2) an address cache and 3) logging area (i.e., a reserved space in SCM). These three components will collaborate with one another to resolve read endurance problem. FIG. 1 illustrates an exemplary architecture for the proposed scheme. The architecture shown here focuses on the introduction for read request handling. Accordingly, we ignore some paths for write request handling, which is not so relevant to the scope of the present invention. Controller Architecture 100 includes three major components, i.e., a read data cache 110, an address cache 120, and a storage class memory controller 130. For Controller Architecture 100, it is usually deployed between host and the SCM memory device. For read data cache 110, it is used to intercept as many read operations as possible from host. Intuitively, it can avoid direct damage to SCM due to excessive read. As shown in FIG. 1, the request address (112 and 122 as shown on the top side of block 100 in FIG. 1) from a host is provided to the read data cache 110 and address cache 120. Once the data of the request address can be found on the read data cache, the request data 114 is returned from this component directly. As the size of read data cache is limited, it is necessary to evict some data from the cache. In our scheme, the data 116 evicted from the cache will be sent to storage class memory controller 130, then the controller 130 will write it to the logging area in SCM. If the data has to be stored in the logging area, there will be a corresponding index created in the address cache 120. The major difference between a read data cache and an address cache is that the address cache does not store the data content; instead, its data content is stored in the logging area. An address cache can naturally accommodate more entries than a read data cache given the same SRAM size.

There are three possible cases for a read request: 1) hit occurs on the read data cache, 2) hit occurs on the address cache, and 3) miss in both two caches. For the first case, the requested data is available in the read data cache and the data 114 is returned from the read data cache as a normal cache does. For the second case, the request address matches an entry in the address cache and the data stored in a logging area is returned. For the third case, the requested data is not in the read data cache nor the request address matches any entry in the address cache; and the data stored in its original location of SCM is returned. For cases 2 and 3, the request data 124 is provided through the SCM controller 130. In the cases of 2 and 3, for any miss on read data cache, the design according to the present invention will try to insert the request address as well as the data (obtained from either logging area or others in SCM) into the read data cache 110 again. For case 2, the design philosophy is that the data being read again in the logging area is more likely a hot data; therefore, inserting a hot data into the read cache 110 can enjoy the performance and avoid read damage. For case 3, we give every read request a possibility to go into the read data cache.

However, there is a performance concern with the above designs. If the request address and the corresponding data in case 2 or 3 always go into the read data cache, it may cause a possibly data eviction from the read data cache and the evicted data will be written to the logging area. In the worst case, each read will produce one additional write to the SCM. For this reason, we propose a throttle design to manage the probability of insertion (cases 2 and 3) and the eviction for the read data cache. For case 2, if the data is read from the logging area, then it will have a probability of A % to be allowed to insert into the read data cache, where 0%<A %<100%. For example, if A % is equal to 20% (i.e., ⅕), then every 5 occurrences of case 2, the data read from the logging area will be inserted into the data cache. Similarly, in case 3, the request that misses on both read data cache and address cache is allowed to be inserted into the read data cache with a probability of B %, where 0%<B %<100%. For example, if B % is equal to 10% (i.e., 1/10), then every 10 occurrences of case 3, the data read from the SCM will be inserted into the data cache.

Figure 2:
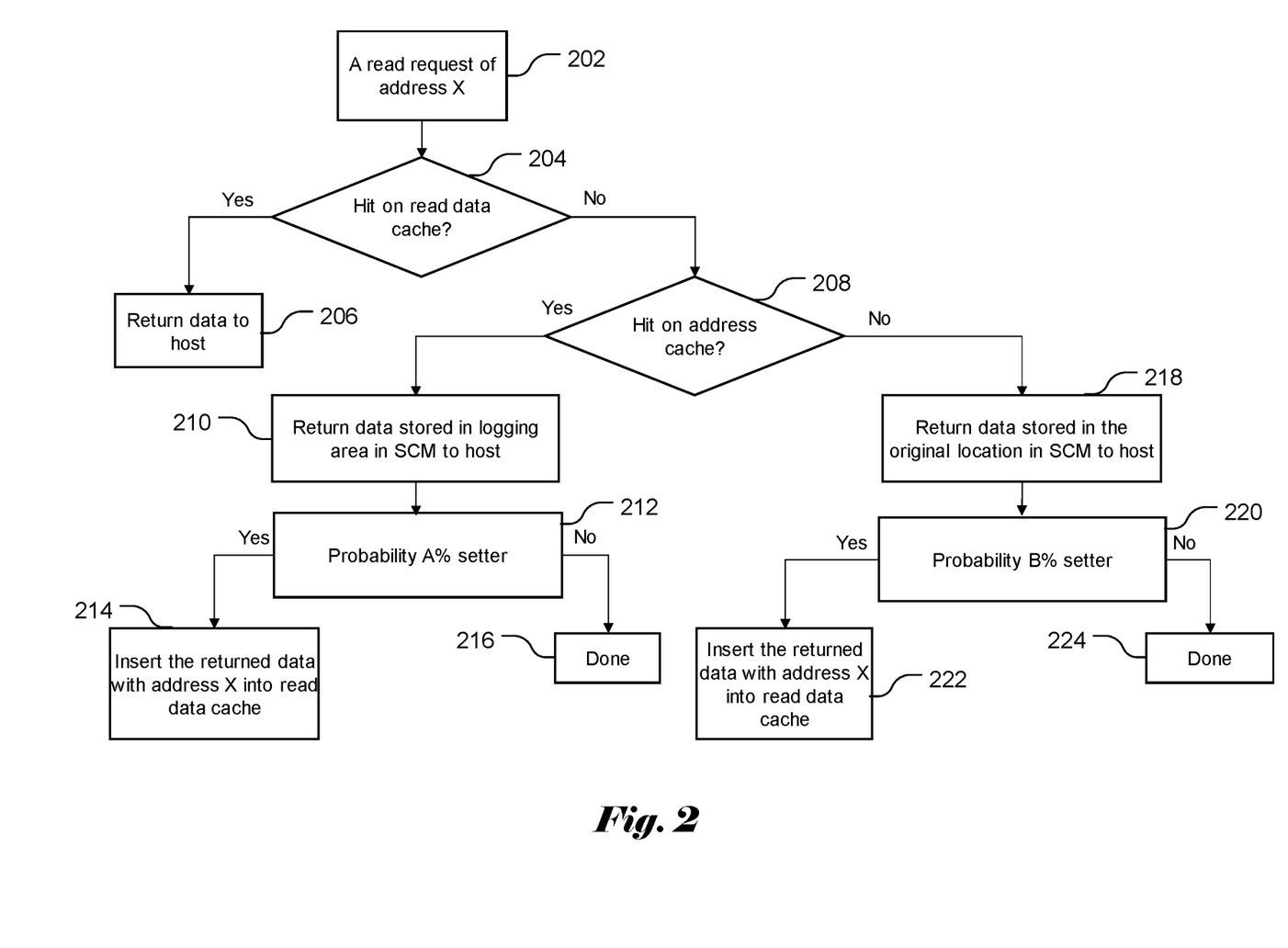
FIG. 2 illustrates an exemplary flowchart for the read operation of the read-leveling control according to an embodiment of the present invention.

FIG. 2 illustrates an exemplary flowchart of how a read operation works in an embodiment of the present invention. Steps 206, 210, and 218 respectively illustrate the case 1, case 2, and case 3. The management for the probability of insertion in case 2 and case 3 will go to steps 212 and 220 respectively. In step 212, if the A % probability setter is set (i.e., the "Yes" path), the returned data with address X is inserted into the read data cache as shown in step 214. If the A % probability setter is not set (i.e., the "No" path), the returned data with address X will not be inserted into the read data cache, (i.e., "No action" or "Done") as shown in step 216. In step 220, if the B % probability setter is set (i.e., the "Yes" path), the returned data with address X is inserted into the read data cache as shown in step 222. If the B % probability setter is not set (i.e., the "No" path), the returned data with address X will not be inserted into the read data cache, (i.e., "No action" or "Done") as shown in step 224. The probability setter can be deterministic or random. In the case of deterministic, the "Yes" and "No" outputs will be generated according to a fixed pattern, such as every n-th output being set to "Yes" for 10% probability setter. In the case of random probability, the probability setter will generate the average occurrence of "Yes" and "No" according to a prescribed probability. A logic circuit or a set of program codes can be used to generate the prescribed probability.

Figure 3:
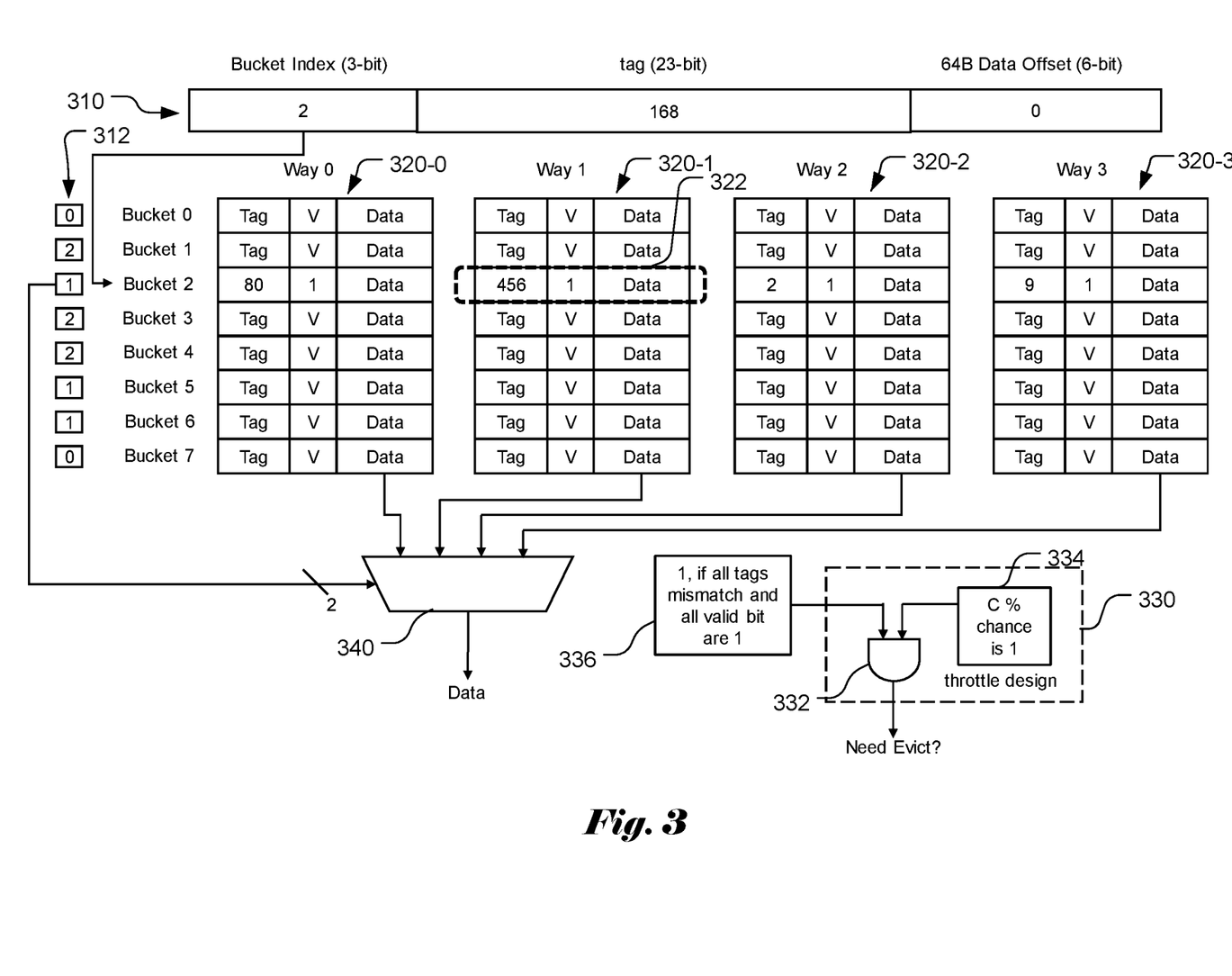
FIG. 3 illustrates an exemplary read data cache design with throttle control according to embodiment of the present invention.

In the case that a request has to be inserted into the read data cache and the cache is full, how do we set a probability of doing an eviction? FIG. 3 illustrates the concept of our throttle design for a typical read data cache. The example shown in FIG. 3 is a four-way read data cache (320-0, 320-1, 320-0, and 320-0). When serving a request, a part of request address will be mapped to a value as a bucket index through a hash function. Auxiliary registers 310 is used to help select a victim. The tags of four entries in the selected bucket will be compared to the tag part, e.g., 168 in the example, of request address to check whether the request address matches any one of them. If matched, the operation is defined as cache hit; otherwise, it is a cache miss. Usually a cache miss will accompany an eviction policy to evict one entry, called victim, from the selected bucket, and then store the request address and its data to the victim location. In this example, each bucket is with one 2-bit counter 312 to indicate which way should be the victim next time. The 2-bit counter is used for the multiplier 340 to select the data for a selected way. In one embodiment, this counter can be implemented in a round-robin fashion; whenever an entry is evicted from the selected bucket, the counter increases and points to next valid entry. In this example, when bucket 2 is selected, the entry in the second way (way 1) 320-1 is victim 322; after the entry 320-1 is evicted, the 2-bit counter will become 2.

In one embodiment of the present invention, the throttle design 330 will set a percentage, e.g., C %, to limit the opportunities that the victim selected by the eviction policy can be discarded. To set the percentage of C %, a probability setter 334 can be used. In this throttle design 330, an eviction is allowed only when two conditions meet at the same time. First, all entries in the selected buckets are valid and their tags are all mismatched with the tag field of the request address as shown in block 336. Second, the C % probability test outputs 1. Both conditions (i.e., 334 and 336) are fed to an "AND" operator 332 so that the eviction is asserted when both conditions are satisfied. For example, if the percentage is C %, there is (100−C) % chances that the selected victim will remain intact when a cache miss occurs. In other words, the maximum number of extra writes produced in case either 2 or 3 is C % of total number of requests. Please note that the embodiment of the present throttle design can be implemented for any generic data cache that needs an eviction policy.

FIG. 3 is intended to illustrate the read data cache design. In practical applications, the size of the read data cache may be much larger. For example, the read data cache may be designed to provide 128K or 256K buckets. When 4-way cache is used, the total number of entries will be 128*4K or 256*4K entries. While a 4-way cache is used in the example, other multi-way design, such as 8-way cache may also be used.

As the victim is selected and passes the test of the throttle design (i.e., decision to evict the victim from the read data cache), the scheme will send the address and the data respectively to the address cache and the logging area. The design of address cache is to store addresses evicted from the read data cache and to track how long the data of each stored address stay in the logging area. As long as the data staying in the logging area exceeds a specific period of time, the associated entry that points to the location of the data will be removed or invalidated from the address cache. Subsequent reads will no longer go to the logging area for those data with invalid (or removed) entries on the address cache. This design purpose is to avoid reading the same location in the logging area repeatedly.

Figure 4:
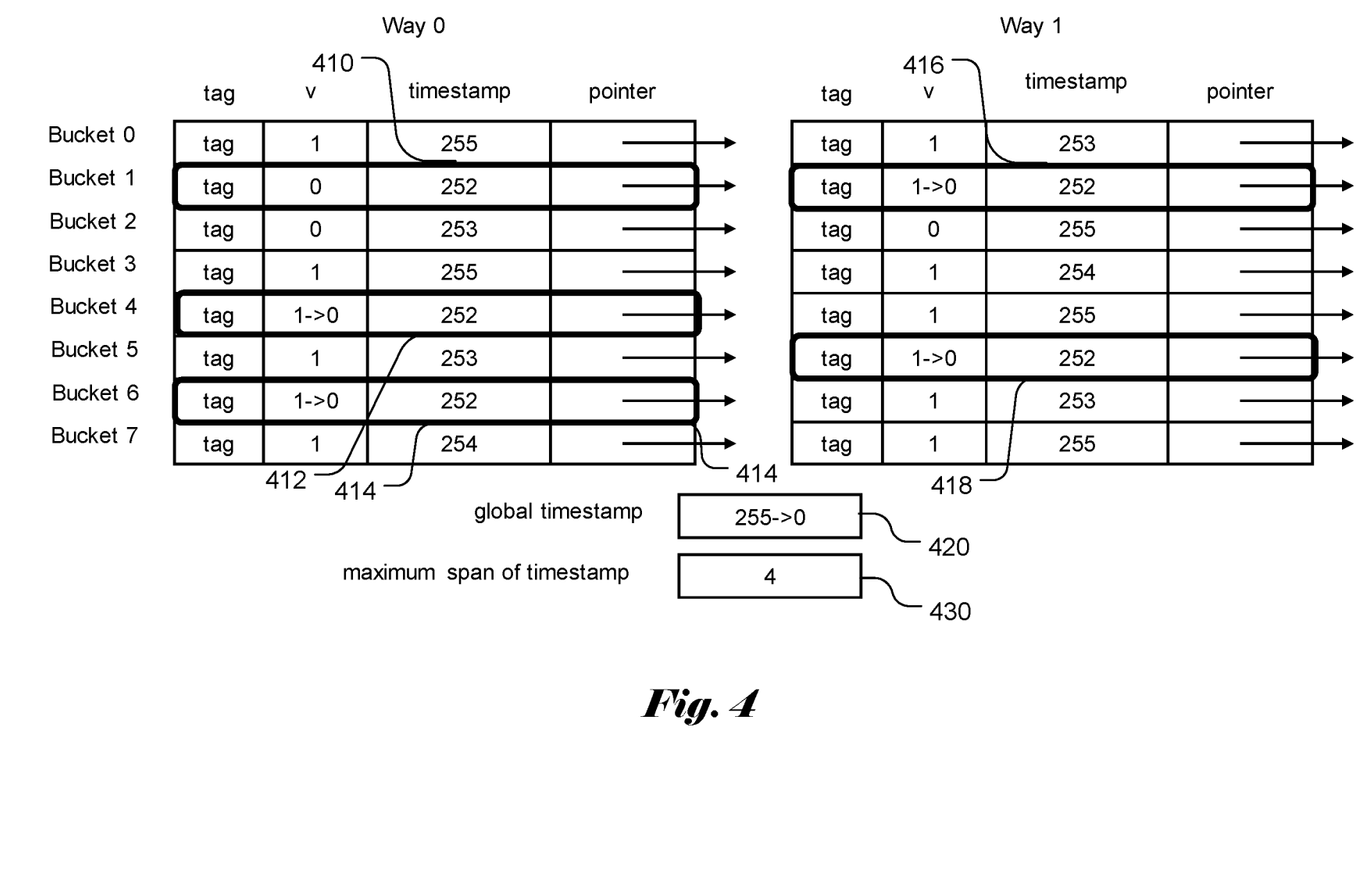
FIG. 4 illustrates an exemplary address cache design with throttle control according to embodiment of the present invention.

FIG. 4 illustrates one embodiment of the address cache design. For each entry in the address cache, there are a valid bit, a pointer, a tag, and a timestamp. The valid bit indicates whether the entry is valid or not. The pointer points to a location in the logging area. The tag field is used to compare with the tag field of the request address, which is similar to the design for the read data cache. The timestamp indicates during which time period this entry was created. Let us define that the system will have a global timestamp 420 with 8-bit size. The global timestamp 420 will increase by one every fixed period of time, such as 10 ms. In other embodiment, the design for the increase of timestamp can depend on the number of read/write requests that come into the system instead of the time period. In this example, if we allocate 8-bit for the timestamp, there are 256 different timestamps at most at the same time for the address cache.

For the design purpose for read leveling, we have to limit the time that the data pointed by an entry can stay on a logging area. To this end, we could set a value for the maximum span of timestamp 430. For example, if it is 4, every time when the global timestamp advances, it is required to check the address cache to determine whether any entry has a timestamp smaller than the global timestamp by 4 in a modulo-256 sense. If such an entry exists, this entry is too old and should be removed by setting valid=0. The data pointed by the removed entry could be regarded as invalid and this data location can be recycled for other purpose. With the above operations, we can guarantee that each data unit, i.e., 64-byte, in the logging area can be read repeatedly for at most 4 timestamps.

For the example shown in FIG. 4, before the global timestamp becomes 0, the entries 410, 412, 414, 416, and 418 have the oldest timestamp (i.e., 252), where 410 is not valid because of v=0. As the global timestamp become 0, entries 412, 414, 416, and 418 will have timestamps smaller than the global timestamp by 4 in a modulo-256 sense. Since the maximum span of timestamp is 4 in this example, these entries should be removed by setting their valid bit to 0.

In addition to the expiration of timestamp, there are two possible cases that an entry on the address cache needs to be removed (invalidated) early. First, when all entries in the address cache are valid and there are more addresses and data evicted from the read data cache, it is still needed to replace some of valid entries with new ones even with throttle design. One embodiment for such a replacement operation is to choose the entry with an oldest timestamp in the sense of modulo. Second, if the host request is a write, the related entry needs to be invalidated when our address cache only focuses on read-leveling design. Certainly, if the address cache is used for the wear-leveling purpose at the same time, the written data will go to a new location in the logging area (i.e., called logging group in the previous disclosure) as disclosed in U.S. Pat. No. 10,229,047 and the pointer of the entry needs to be modified accordingly.

Figure 5:
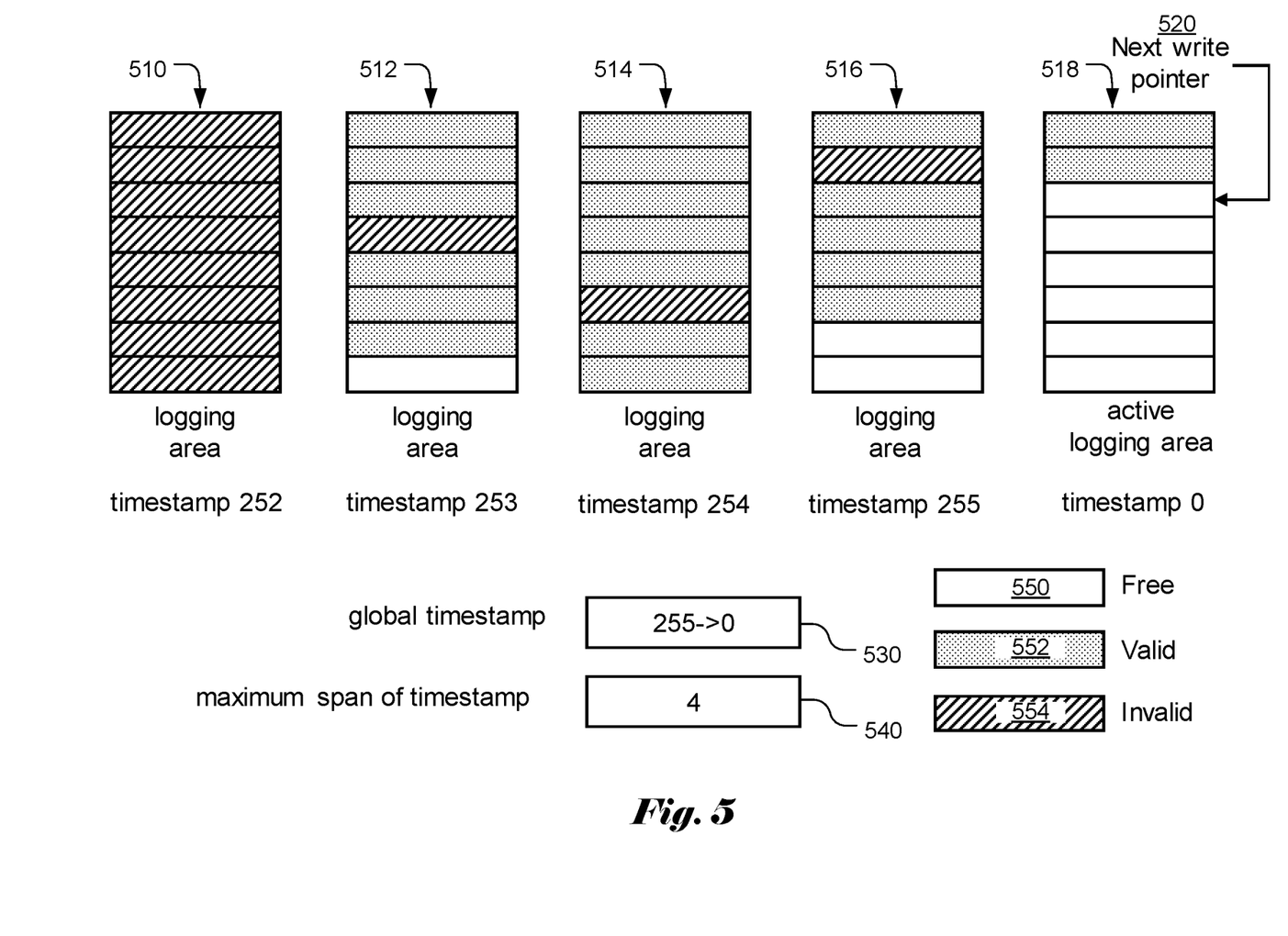
FIG. 5 illustrates one example of logging area design, where multiple logging areas are used and each logging area has a different timestamp for determining the oldest logging area.

The maximum number of requests going to the address cache and a logging area during each timestamp depends on the condition for increasing timestamp and the percentage of the throttle design. In this embodiment, we allocate multiple logging areas from SCM, each logging area is associated with one different timestamp, and the size of each logging area is just large enough to accommodate the maximum number of requests from the read data cache during each timestamp. During each different global timestamp, there will be one active logging area and a pointer indicates the next location to be written in the active logging area, and the pointer will move forward sequentially till the end of a logging area. FIG. 5 illustrates one example of the logging area design. There are five logging areas 510, 512, 514, 516, and 518. Logging area 518 is an active logging area, and the next write pointer 520 indicates the next location that should be written to logging area 518. In the example, the system have a global timestamp 530 with 8-bit size and the value for the maximum span of timestamp 540 is equal to 4.

In the previous example, if the maximum span of timestamp is set to 4, there are at least four logging areas allocated at the same time. When the global timestamp increases, there will be one new logging area allocated and served as an active logging area. Meanwhile, a background process should be initiated to check whether any entry on the address cache has a timestamp smaller than the global timestamp by 4 in a modulo-256 sense. When the process is done and all expired entries are invalidated, the oldest logging area can be recycled or returned back to free space. In the example of FIG. 5, each location in a logging area will have three status, i.e., free, valid, and invalid states. A free location means that it hasn't been written since its logging area was allocated. A valid location means that there is a valid entry (on the address cache) whose pointer stores the address of this location. An invalid location means that this location has been written when it was served as a logging area, but there is no valid entry pointing to this location now. Logging area 510 with timestamp 252 is the oldest one and all of its data are all expired and should be invalidated after the global timestamp becomes 0.

Since the data in each logging group can only be read during the maximum span of timestamp, after that, the read of the same request address will go to either another logging area or the read data cache. Therefore, the number of reads sent to the same location in SCM can be bounded, and the reads can be distributed among different logging areas. In one embodiment, the allocation for logging areas could be implemented in a round-robin fashion. Please note that the allocation strategy is not limited in our disclosure. Our proposed scheme and any allocation strategy that can evenly use different space in SCM can reinforce each other for resolving read endurance issue.

Figure 6:
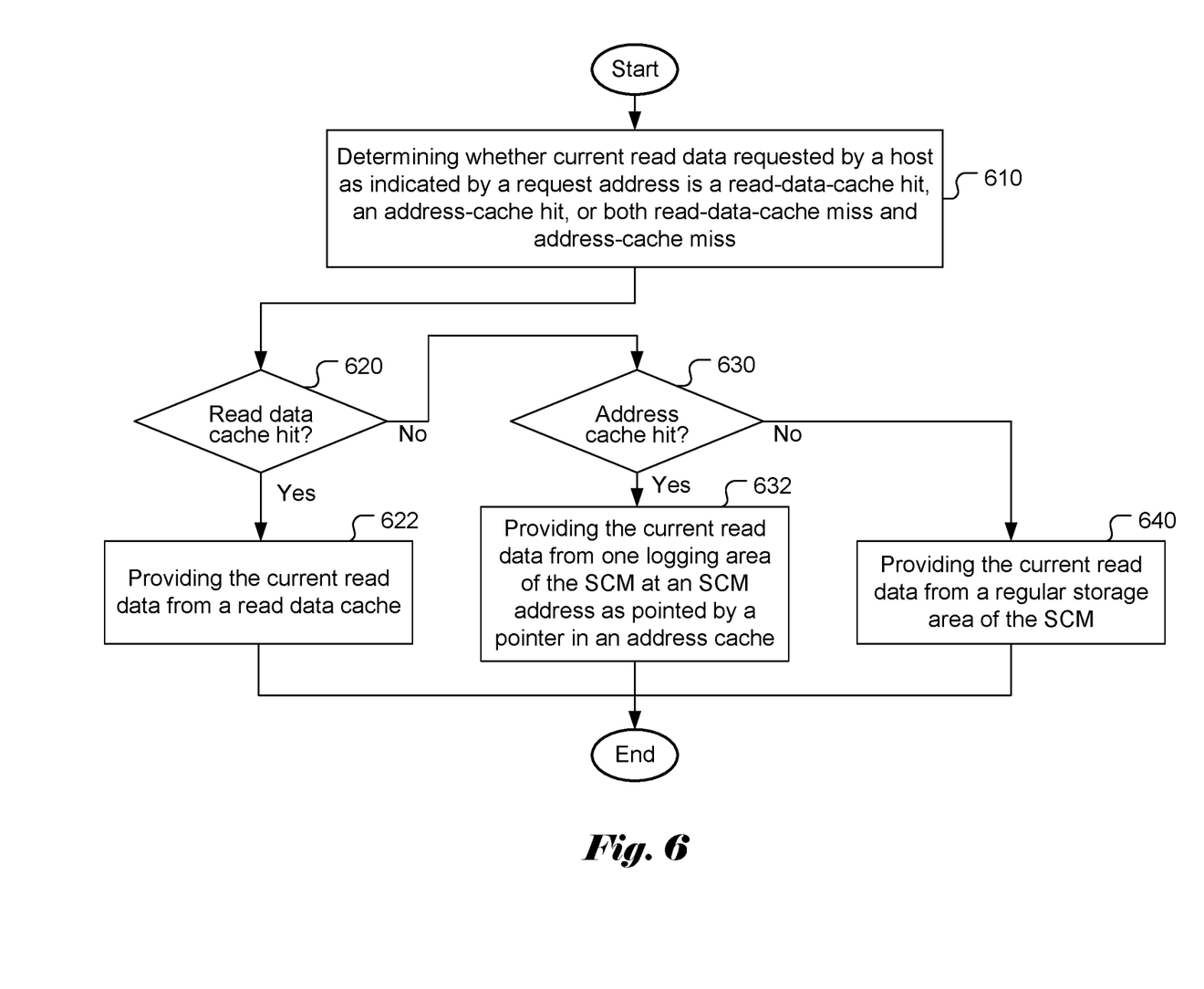
FIG. 6 illustrates an exemplary flowchart for a read-leveling control according to an embodiment of the present invention.

FIG. 6 illustrates an exemplary flowchart for a read-leveling control according to an embodiment of the present invention. The steps shown in the flowchart may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, whether current read data requested by a host as indicated by a request address is a read-data-cache hit, an address-cache hit or both read-data-cache miss and address-cache miss is determined in step 610. Whether the read-data-cache hit is determined is checked in step 620. If it is the read-data-cache hit (i.e., the "Yes" path from step 620), the current read data is provided from a read data cache in step 622. If it is not the read-data-cache hit (i.e., the "No" path from step 620), it further checks whether the address-cache hit is determined in step 630. If it is the address-cache hit (i.e., the "Yes" path from step 630), the current read data is provided from one logging area of the SCM at an SCM address as pointed by a pointer in an address cache in step 632. If it is not the address-cache hit (i.e., the "No" path from step 630), it implies both the read-data-cache miss and the address-cache miss are determined, and the current read data is provided from a regular storage area of the SCM in step 640.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of read wear-leveling control for SCM (Storage Class Memory) based on nonvolatile memory, the method comprising:
    determining whether current read data requested by a host as indicated by a request address is a read-data-cache hit, an address-cache hit, or both read-data-cache miss and address-cache miss;
    when the read-data-cache hit is determined, providing the current read data from a read data cache;
    when the address-cache hit is determined, providing the current read data from one logging area of the SCM at an SCM address as pointed by a pointer in an address cache; and
    when both the read-data-cache miss and the address-cache miss are determined, providing the current read data from a regular storage area of the SCM.

2. The method of claim 1, wherein when the address-cache hit is determined, the current read data in said one logging area of the SCM is a candidate to be written into the read data cache.

3. The method of claim 2, wherein when the address-cache hit is determined, the current read data in said one logging area of the SCM is written into the read data cache according to a pre-defined probability greater than 0% and small than 100%.

4. The method of claim 1, wherein when both the read-data-cache miss and the address-cache miss are determined, the current read data in the regular storage area of the SCM is a candidate to be written into the read data cache.

5. The method of claim 4, wherein when both the read-data-cache miss and the address-cache miss are determined, the current read data in the regular storage area of the SCM is written into the read data cache according to a pre-defined probability.

6. The method of claim 1, wherein when the address-cache hit or both the read-data-cache miss and the address-cache miss are determined and the current read data is written into the read data cache, an existing entry of the read data cache is evicted from the read data cache to make room for the request address and corresponding data if there is no space available for the request address and the corresponding data being written.

7. The method of claim 6, wherein a throttle control is used to regulate eviction of the existing entry of the read data cache if there is no space available for the request address and the corresponding data, and wherein the throttle control sets a probability greater than 0% and small than 100% to enable the eviction when eviction conditions are satisfied.

8. The method of claim 6, wherein existing data in the existing entry of the read data cache being evicted is stored in said one logging area of the SCM and a corresponding address is stored in the address cache.

9. The method of claim 8, wherein when a time period that a target data stays in said logging area of the SCM exceeds a pre-defined period, an associated entry that points to a location of the target data will be removed or invalidated from the address cache.

10. The method of claim 8, wherein when a number of access to a target data in said logging area of the SCM exceeds a pre-defined number, an associated entry that points to a location of the target data will be removed or invalidated from the address cache.

11. The method of claim 8, wherein each location of said one logging area has three statuses corresponding to free state, valid state and invalid state, wherein the free state indicates that a corresponding location in said one logging area has not been written since the location in said one logging area is allocated, the valid state indicated that a valid entry in the address cache stores a pointer pointing to the corresponding location, and the invalid state indicated that the corresponding location has been written when the corresponding location was served as one of said one logging area, but there is no valid entry pointing to the corresponding location now.

12. The method of claim 11, wherein when all entries in the address cache are valid and one or more addresses and data are evicted from the read data cache, one or more entries of the address cache are replaced by new entries.

13. The method of claim 1, wherein each entry of the address cache includes an entry timestamp to indicate creation time of corresponding entry of the address cache and a global timestamp corresponding to K-bit size is increased by one for every fixed period of time, and wherein a target entry of the address cache has a corresponding entry timestamp smaller than the global timestamp by N in a modulo-$2^K$ sense, the target entry of the address cache is removed, wherein N and K are positive integers.

14. The method of claim 1, wherein at least N logging areas are allocated at the same time and each of said at least N logging areas is associated with a different timestamp, and wherein only one of said at least N logging areas is used as an active logging area during a different global timestamp and a pointer indicating a next location to be written in the active logging area moves forward sequentially through all entries of the active logging area, and wherein N is a positive integer.

15. The method of claim 14, wherein a maximum span of timestamp is set to N and a background process is initiated to check whether any entry in the address cache has a timestamp smaller than a global timestamp by N in a modulo-$2^K$ sense, and wherein when the background process is done and all expired entries are invalidated, an oldest logging area is recycled or returned back to free space, and wherein K is a positive integer.

16. An apparatus for wear leveling control for SCM (Storage Class Memory), the apparatus comprising:
   a read data cache;
   an address cache;
   a non-volatile memory; and
   an SCM controller coupled to read data cache, the address cache, and the non-volatile memory;
   wherein the read data cache, the address cache and the SCM controller are configured to perform at least the following:
      determining whether current read data requested by a host as indicated by a request address is a read-data-cache hit, an address-cache hit, or both read-data-cache miss and address-cache miss;
      when the read-data-cache hit is determined, providing the current read data from the read data cache;
      when the address-cache hit is determined, providing the current read data from one logging area of the SCM at an SCM address as pointed by a pointer in the address cache; and
      when both the read-data-cache miss and the address-cache miss are determined, providing the current read data from a regular storage area of the SCM.

* * * * *